US012705184B2

(12) United States Patent
Rathee et al.

(10) Patent No.: US 12,705,184 B2
(45) **Date of Patent: *Aug. 11, 2026**

(54) USING RETIRED PAGES HISTORY FOR INSTRUCTION TRANSLATION LOOKASIDE BUFFER (TLB) PREFETCHING IN PROCESSOR-BASED DEVICES

(71) Applicant: QUALCOMM Incorporated, San Diego, CA (US)

(72) Inventors: Ajay Kumar Rathee, San Jose, CA (US); Conrado Blasco, San Mateo, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/626,488

(22) Filed: Apr. 4, 2024

(65) Prior Publication Data

US 2024/0264949 A1 Aug. 8, 2024

Related U.S. Application Data

(63) Continuation of application No. 18/340,291, filed on Jun. 23, 2023.

(Continued)

(51) Int. Cl.
*G06F 3/00* (2006.01)
*G06F 12/00* (2006.01)

(Continued)

(52) U.S. Cl.
CPC ...... *G06F 12/1027* (2013.01); *G06F 12/1009* (2013.01); *G06F 2212/1021* (2013.01)

(58) Field of Classification Search
CPC ............. G06F 12/1027; G06F 12/1009; G06F 2212/1021

(Continued)

(56) References Cited

U.S. PATENT DOCUMENTS 4,035,778 A * 7/1977 Ghanem .............. G06F 12/121 711/E12.07
4,887,235 A * 12/1989 Holloway ............ G06F 13/287 714/E11.002

(Continued)

FOREIGN PATENT DOCUMENTS

EP 0424163 A2 4/1991

OTHER PUBLICATIONS

International Search Report and Written Opinion for International Patent Application No. PCT/US2023/069044, mailed Sep. 15, 2023, 15 pages.

(Continued)

*Primary Examiner* — Sheng Jen Tsai
(74) *Attorney, Agent, or Firm* — W&T

(57) ABSTRACT

Using retired pages history for instruction translation lookaside buffer (TLB) prefetching in processor-based devices is disclosed herein. In some exemplary aspects, a processor-based device is provided. The processor-based device comprises a history-based instruction TLB prefetcher (HTP) circuit configured to determine that a first instruction of a first page has been retired. The HTP circuit is further configured to determine a first page virtual address (VA) of the first page. The HTP circuit is also configured to determine that the first page VA differs from a value of a last retired page VA indicator of the HTP circuit. The HTP circuit is additionally configured to, responsive to determining that the first page VA differs from the value of the last retired page VA indicator of the HTP circuit, store the first page VA as the value of the last retired page VA indicator.

16 Claims, 5 Drawing Sheets

Related U.S. Application Data

(60) Provisional application No. 63/369,996, filed on Aug. 1, 2022.

(51) Int. Cl.
*G06F 12/1009* (2016.01)
*G06F 12/1027* (2016.01)

(58) Field of Classification Search
USPC .......................................................... 711/118
See application file for complete search history.

(56) References Cited

U.S. PATENT DOCUMENTS 4,922,414 A * 5/1990 Holloway ............ G06F 13/287 714/E11.002
5,226,126 A * 7/1993 McFarland ......... G06F 9/30189 712/E9.05
5,377,336 A * 12/1994 Eickemeyer .......... G06F 9/3832 711/213
5,410,700 A * 4/1995 Fecteau ................... G06F 9/466 718/100
5,539,911 A * 7/1996 Nguyen ................ G06F 9/3802 712/E9.055
5,596,570 A * 1/1997 Soliman ............ H04B 17/3912 370/335
5,613,083 A * 3/1997 Glew .................. G06F 12/1027 711/208
5,680,565 A * 10/1997 Glew .................. G06F 12/1027 712/E9.05
5,694,568 A * 12/1997 Harrison, III ........... G06F 9/383 711/213
5,734,881 A * 3/1998 White .................. G06F 9/3812 712/E9.059
5,765,016 A 6/1998 Walker
5,778,435 A 7/1998 Berenbaum et al.
5,819,079 A 10/1998 Glew et al.
6,035,393 A * 3/2000 Glew .................... G06F 9/3861 712/E9.055
6,175,898 B1 * 1/2001 Ahmed ................. G06F 9/3832 711/204
6,282,613 B1 8/2001 Hsu et al.
6,463,522 B1 * 10/2002 Akkary ................ G06F 9/3851 712/216
6,633,970 B1 * 10/2003 Clift ...................... G06F 9/3842 712/E9.05
7,386,669 B2 * 6/2008 Dombrowski ...... G06F 12/1027 718/107
7,487,333 B2 * 2/2009 Nguyen ............. G06F 9/30072 712/206
7,746,099 B1 * 6/2010 Chan ................ H03K 19/17756 326/38
8,190,804 B1 5/2012 Srinivasan et al.
8,397,049 B2 * 3/2013 Wang .................. G06F 12/1027 711/E12.078
8,880,844 B1 * 11/2014 Bhattacharjee ..... G06F 12/1027 711/204
9,081,501 B2 * 7/2015 Asaad ..................... G06F 15/76
9,129,214 B1 * 9/2015 Gomez-Uribe .......... G06N 7/01
9,158,705 B2 * 10/2015 Topp ................... G06F 12/1027
9,547,600 B2 * 1/2017 Tarasuk-Levin .... G06F 12/0868
9,569,363 B2 * 2/2017 Hooker ................... G06F 12/10
9,690,582 B2 * 6/2017 Vasudevan .......... G06F 9/30036
9,747,220 B2 * 8/2017 Goss ................... G06F 12/1009
10,133,582 B2 * 11/2018 Kosarev ................ G06F 9/3888
10,496,410 B2 * 12/2019 Heinecke ................ G06F 9/383
10,496,413 B2 * 12/2019 Gaur ..................... G06F 9/3838
10,514,927 B2 * 12/2019 Lechanka ............. G06F 9/3824
11,663,130 B1 5/2023 Sugumar
2003/0120906 A1 6/2003 Jourdan et al.
2005/0071571 A1 3/2005 Luick
2005/0204119 A1 9/2005 Saha
2006/0230252 A1 * 10/2006 Dombrowski ...... G06F 12/1027 711/205
2007/0294496 A1 * 12/2007 Goss ................... G06F 12/1408 711/163
2008/0201540 A1 * 8/2008 Sahita ..................... G06F 12/08 711/159
2008/0288731 A1 11/2008 Izumi
2009/0164715 A1 * 6/2009 Astigarraga ............ G06F 12/08 711/112
2009/0164900 A1 * 6/2009 Shewchuk .............. G06F 9/453 715/714
2010/0299508 A1 * 11/2010 Luttrell ................. G06F 9/3824 712/234
2010/0333098 A1 * 12/2010 Jordan .................. G06F 9/3853 718/103
2011/0010521 A1 * 1/2011 Wang .................. G06F 12/1027 711/E12.078
2011/0167243 A1 * 7/2011 Yip ....................... G06F 9/3895 712/228
2011/0219208 A1 * 9/2011 Asaad ....................... G06F 9/06 712/12
2011/0264862 A1 * 10/2011 Karlsson ............... G06F 9/3842 712/205
2011/0296135 A1 * 12/2011 Shah ................... G06F 16/1727 711/E12.001
2012/0036334 A1 * 2/2012 Horman .............. G06F 13/1663 711/E12.001
2012/0226888 A1 9/2012 Rychlik et al.
2013/0103923 A1 4/2013 Pan
2013/0326121 A1 * 12/2013 Cheng ................. G06F 12/0246 711/103
2014/0108766 A1 * 4/2014 Desai ................. G06F 12/1027 711/E12.004
2014/0195771 A1 * 7/2014 Adderly ............. G06F 12/1027 711/204
2014/0281351 A1 * 9/2014 Topp ................... G06F 12/1027 711/205
2014/0337031 A1 * 11/2014 Kim ........................ G10L 15/08 704/251
2014/0372707 A1 * 12/2014 Diep ..................... G06F 3/0647 711/135
2015/0039838 A1 * 2/2015 Tarasuk-Levin ...... G06F 9/5016 711/137
2015/0127984 A1 * 5/2015 Alapati ................... G06F 11/26 714/33
2015/0269124 A1 * 9/2015 Hamze ................... G06N 10/60 703/2
2015/0277915 A1 * 10/2015 Kelm .................... G06F 9/4552 712/226
2015/0278025 A1 10/2015 Khartikov et al.
2015/0347042 A1 * 12/2015 Kim ........................ G06F 12/10 711/165
2016/0124490 A1 5/2016 Kupermann et al.
2016/0179662 A1 * 6/2016 Keppel ............... G06F 12/1009 711/208
2016/0179667 A1 6/2016 Kumar et al.
2016/0232105 A1 * 8/2016 Goss ....................... G06F 21/78
2016/0239212 A1 * 8/2016 Solihin ............... G06F 11/3447
2017/0046073 A1 * 2/2017 Guo ...................... G06F 3/0679
2017/0083724 A1 * 3/2017 Chhabra ............... H04L 9/3242
2017/0090935 A1 * 3/2017 Falsafi ................ G06F 12/0862
2017/0161194 A1 * 6/2017 Loh ..................... G06F 12/1063
2017/0206033 A1 * 7/2017 Ma ........................ G06F 3/0656
2017/0262215 A1 * 9/2017 Banerjee ............. G06F 9/45558
2017/0357584 A1 * 12/2017 Kumar ................ G06F 11/1441
2018/0136840 A1 * 5/2018 Ouyang ................ G06F 3/0688
2018/0232233 A1 * 8/2018 Wright .................. G06F 9/3806
2018/0285112 A1 10/2018 Mekkat et al.
2018/0330768 A1 * 11/2018 Prohofsky ........... G06F 11/1076
2019/0034353 A1 * 1/2019 Liem ....................... G06F 12/12
2020/0210346 A1 7/2020 Britto et al.
2020/0285580 A1 9/2020 Subramanian et al.
2020/0348954 A1 * 11/2020 Banerjee ............. G06F 9/45545
2020/0349260 A1 * 11/2020 Ryan ................... G06F 9/45558
2021/0149812 A1 * 5/2021 Sen ..................... H04L 67/1095
2021/0149819 A1 * 5/2021 Kotra .................. G06F 12/1027
2022/0197821 A1 6/2022 Heirman et al.
2022/0309001 A1 * 9/2022 Campbell ........... G06F 12/0862
2022/0357859 A1 * 11/2022 Labat .................... G06F 3/0644

(56) References Cited

U.S. PATENT DOCUMENTS

| | | | | |
|---|---|---|---|---|
| 2022/0357955 | A1* | 11/2022 | Favor | G06F 9/30043 |
| 2023/0259457 | A1* | 8/2023 | Song | G06F 12/0888 |
| 2024/0037042 | A1 | 2/2024 | Rathee et al. | |
| 2024/0054079 | A1* | 2/2024 | Han | G06F 12/023 |

OTHER PUBLICATIONS

Nesbit K.J., et al., "Data Cache Prefetching Using a Global History Buffer", IEEE, 10th International Symposium on High Performance Computer Architecture (HPCA'04), Feb. 14-18, 2004, 10 Pages.

Vavouliotis G., et al., "Morrigan: A Composite Instruction TLB Prefetcher", 54th Annual IEEE/ACM International Symposium on Microarchitecture (MICRO-54), Oct. 17, 2021, pp. 1138-1153.

* cited by examiner

USING RETIRED PAGES HISTORY FOR INSTRUCTION TRANSLATION LOOKASIDE BUFFER (TLB) PREFETCHING IN PROCESSOR-BASED DEVICES

PRIORITY APPLICATIONS

The present application is a continuation of and claims priority to U.S. patent application Ser. No. 18/340,291, filed Jun. 23, 2023 and entitled "USING RETIRED PAGES HISTORY FOR INSTRUCTION TRANSLATION LOOKASIDE BUFFER (TLB) PREFETCHING IN PROCESSOR-BASED DEVICES," which is incorporated herein by reference in its entirety.

U.S. patent application Ser. No. 18/340,291 claims priority to U.S. Provisional Patent Application Ser. No. 63/369,996, filed Aug. 1, 2022 and entitled "USING RETIRED PAGES HISTORY FOR INSTRUCTION TRANSLATION LOOKASIDE BUFFER (TLB) PREFETCHING IN PROCESSOR-BASED DEVICES," which is incorporated herein by reference in its entirety.

BACKGROUND

I. Field of the Disclosure

The technology of the disclosure relates generally to instruction translation lookaside buffer (TLB) prefetching in processor-based devices.

II. Background

Microprocessors, also referred to herein as "processors," perform computational tasks for a wide variety of applications. Conventional processors employ a processing technique known as instruction pipelining, whereby the throughput of computer instructions being executed may be increased by dividing the processing of each instruction into a series of steps which are then executed within an execution pipeline that is composed of multiple stages. Optimal processor performance may be achieved if all stages in an execution pipeline are able to process instructions concurrently and sequentially as the instructions are ordered in the execution pipeline. Conventional processors also make use of virtual memory, which refers to a memory management mechanism that maps memory addresses referenced by executing processes (i.e., "virtual addresses") to physical addresses within system memory. By using virtual memory, processor-based systems are able to provide access to a virtual memory space larger than the actual physical memory space, and to enhance inter-process security through memory isolation. The mapping of virtual memory addresses to their corresponding physical memory addresses is accomplished using data structures known as page tables. To further improve performance, page table entries retrieved from the page tables during virtual-to-physical memory address translation are cached in a data structure referred to as a translation lookaside buffer, or TLB.

The performance of conventional processors may be negatively affected by instruction TLB demand misses, which occur when an instruction TLB does not contain a TLB entry corresponding to a page containing an instruction to be fetched and executed. An instruction TLB demand miss may necessitate a stall, during which the processor must wait for the virtual-to-physical memory address translation to be performed for the virtual address of the page containing the instruction. Such stalls waste processor cycles during which the processor could be performing productive work.

One approach to reducing the effects of instruction TLB demand misses employs a mechanism known as a history-based TLB prefetcher (HTP). An HTP associates an instruction TLB demand miss with a history of one or more previous instruction TLB demand misses, so that a repeat of the previous instruction TLB demand miss(es) can trigger an instruction TLB prefetch and hopefully prevent a repeat of the subsequent instruction TLB demand miss. However, current conventional HTPs may provide suboptimal performance due to the instruction TLB prefetching's dependence on the occurrence of a previous instruction TLB demand miss that in fact may not occur. Moreover, the accuracy of conventional HTPs may be negatively impacted by prefetching done on speculative execution paths.

SUMMARY OF THE DISCLOSURE

Aspects disclosed in the detailed description include using retired pages history for instruction translation lookaside buffer (TLB) prefetching in processor-based devices. Related apparatus and methods are also disclosed. In this regard, in some exemplary aspects disclosed herein, a processor-based device provides a history-based TLB prefetcher (HTP) circuit that is configured to track a last retired page virtual address (VA), which represents the page VA of the page containing the most recently retired instruction. When the HTP circuit detects that a retirement of an instruction belonging to a page having a VA that is different from the last retired page VA has taken place, the HTP circuit captures the page VA of the page containing the retired instruction, and stores the captured page VA as the last retired page VA. The HTP circuit also tracks each subsequent instruction TLB demand miss by creating a corresponding history table entry, which associates the page VA of the instruction TLB demand miss with the last retired page VA, in a history table of the HTP circuit. When the last retired page VA is updated by the HTP circuit, the HTP circuit queries the history table and, if a history table entry that corresponds to the (new) last retired page VA is identified, the HTP circuit initiates an instruction TLB prefetch request for the page VA of the instruction TLB demand miss associated with the last retired page VA in the history table entry. By associating an instruction TLB demand miss with the last retired page VA, instruction TLB prefetches can be performed in a more accurate and timely manner, thus improving processor performance.

In another aspect, a processor-based device is provided. The processor-based device comprises an HTP circuit configured to determine that a first instruction of a first page has been retired. The HTP circuit is further configured to determine a first page VA of the first page. The HTP circuit is also configured to determine that the first page VA differs from a value of a last retired page VA indicator of the HTP circuit. The HTP circuit is additionally configured to, responsive to determining that the first page VA differs from the value of the last retired page VA indicator of the HTP circuit, store the first page VA as the value of the last retired page VA indicator. The HTP circuit is further configured to determine that an instruction TLB demand for a second page VA of a second page resulted in a miss. The HTP circuit is also configured to responsive to determining that the instruction TLB demand for the second page VA resulted in a miss, store a history table entry representing an association of the second page VA and the value of the last retired page VA indicator in a history table of the HTP circuit. The HTP circuit is additionally configured to identify the history table entry that corresponds to the first page VA and that indicates a previous instruction TLB demand miss for the second page VA. The HTP circuit is further configured to initiate an instruction TLB prefetch request for the second page VA.

In another aspect, a processor-based device is provided. The processor-based device comprises an HTP circuit configured to determine that a first instruction of a first page has been retired. The HTP circuit is further configured to determine a first page VA of the first page. The HTP circuit is also configured to determine that the first page VA differs from a value of a last retired page VA indicator of the HTP circuit. The HTP circuit is additionally configured to, responsive to determining that the first page VA differs from the value of the last retired page VA indicator of the HTP circuit, store the first page VA as the value of the last retired page VA indicator.

In another aspect, a processor-based device is provided. The processor-based device comprises means for determining that a first instruction of a first page has been retired. The processor-based device further comprises means for determining a first page VA of the first page. The processor-based device also comprises means for determining that the first page VA differs from a value of a last retired page VA indicator. The processor-based device additionally comprises means for storing the first page VA as the value of the last retired page VA indicator, responsive to determining that the first page VA differs from the value of the last retired page VA indicator.

In another aspect, a method for using retired pages history for instruction TLB prefetching in processor-based devices is provided. The method comprises determining, by an HTP circuit of a processor-based device, that a first instruction of a first page has been retired. The method further comprises determining, by the HTP circuit, a first page VA of the first page. The method also comprises determining, by the HTP circuit, that the first page VA differs from a value of a last retired page VA indicator of the HTP circuit. The method additionally comprises, responsive to determining that the first page VA differs from the value of the last retired page VA indicator of the HTP circuit, storing, by the HTP circuit, the first page VA as the value of the last retired page VA indicator.

DETAILED DESCRIPTION

Figure 1:
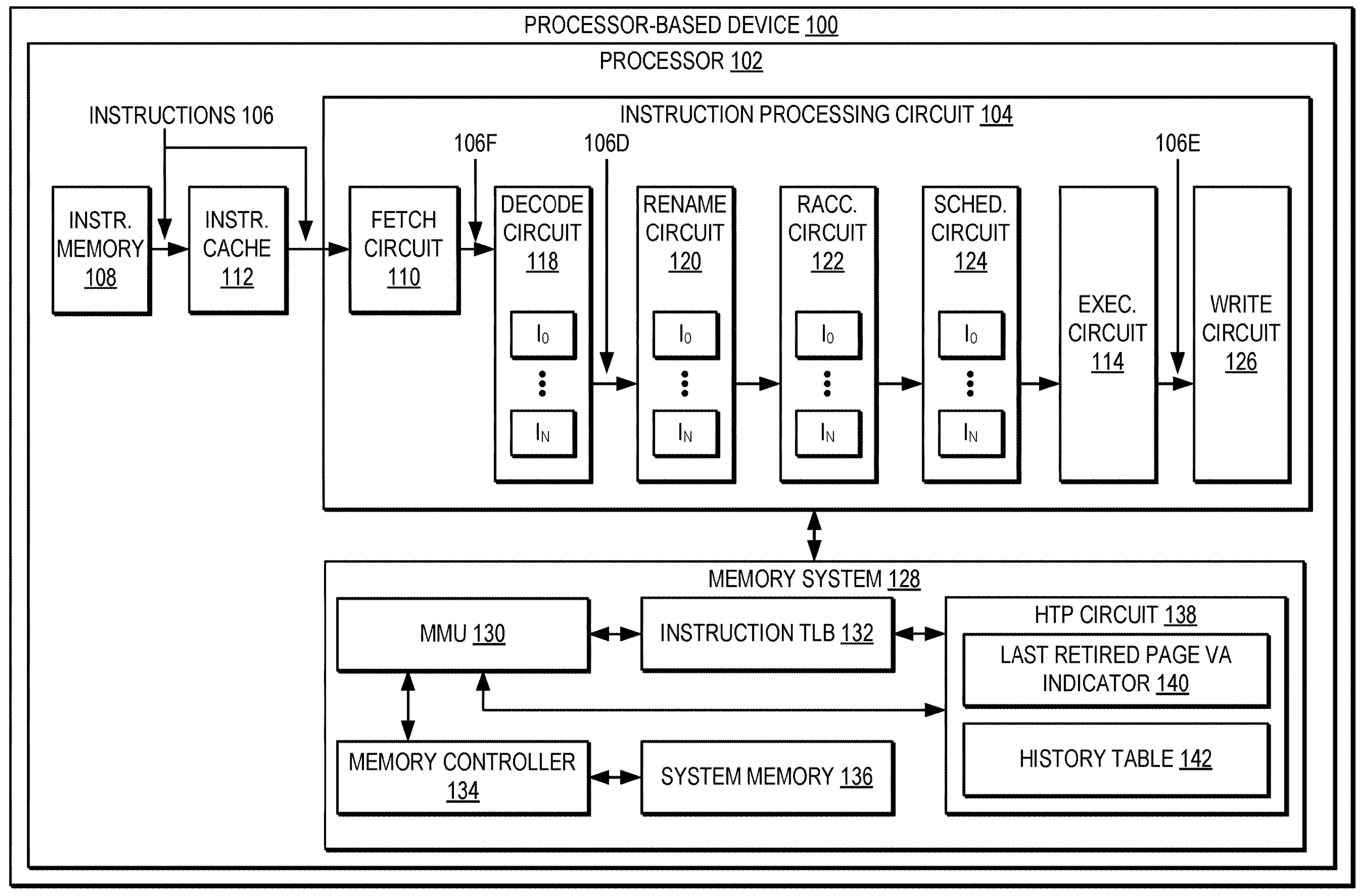
FIG. 1 is a block diagram of an exemplary processor-based device including a history-based translation lookaside buffer (TLB) prefetcher (HTP) circuit configured to use retired pages history for instruction TLB prefetching, according to some aspects.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include using retired pages history for instruction translation lookaside buffer (TLB) prefetching in processor-based devices. Related apparatus and methods are also disclosed. In this regard, in some exemplary aspects disclosed herein, a processor-based device provides a history-based TLB prefetcher (HTP) circuit that is configured to track a last retired page virtual address (VA), which represents the page VA of the page containing the most recently retired instruction. When the HTP circuit detects that a retirement of an instruction belonging to a page having a VA that is different from the last retired page VA has taken place, the HTP circuit captures the page VA of the page containing the retired instruction, and stores the captured page VA as the last retired page VA. The HTP circuit also tracks each subsequent instruction TLB demand miss by creating a corresponding history table entry, which associates the page VA of the instruction TLB demand miss with the last retired page VA, in a history table of the HTP circuit. When the last retired page VA is updated by the HTP circuit, the HTP circuit queries the history table and, if a history table entry that corresponds to the (new) last retired page VA is identified, the HTP circuit initiates an instruction TLB prefetch request for the page VA of the instruction TLB demand miss associated with the last retired page VA in the history table entry. By associating an instruction TLB demand miss with the last retired page VA, instruction TLB prefetches can be performed in a more accurate and timely manner, thus improving processor performance.

In this regard, FIG. 1 is a diagram of an exemplary processor-based device 100 that includes a processor 102. The processor 102, which also may be referred to as a "processor core" or a "central processing unit (CPU) core," may be an in-order or an out-of-order processor (OoP), and/or may be one of a plurality of processors 102 provided by the processor-based device 100. In the example of FIG. 1, the processor 102 includes an instruction processing circuit 104 that includes one or more instruction pipelines $I_0$-$I_N$ for processing instructions 106 fetched from an instruction memory (captioned "INSTR. MEMORY" in FIG. 1) 108 by a fetch circuit 110 for execution. The instruction memory 108 may be provided in or as part of a system memory in the processor-based device 100, as a non-limiting example. An instruction cache (captioned "INSTR. CACHE" in FIG. 1) 112 may also be provided in the processor 102 to cache the instructions 106 fetched from the instruction memory 108 to reduce latency in the fetch circuit 110.

The fetch circuit 110 in the example of FIG. 1 is configured to provide the instructions 106 as fetched instructions 106F into the one or more instruction pipelines $I_0$-$I_N$ in the instruction processing circuit 104 to be pre-processed, before the fetched instructions 106F reach an execution circuit (captioned "EXEC. CIRCUIT" in FIG. 1) 114 to be executed. The instruction pipelines $I_0$-$I_N$ are provided across different processing circuits or stages of the instruction processing circuit 104 to pre-process and process the fetched instructions 106F in a series of steps that can be performed concurrently to increase throughput prior to execution of the fetched instructions 106F by the execution circuit 114.

With continuing reference to FIG. 1, the instruction processing circuit 104 includes a decode circuit 118 configured to decode the fetched instructions 106F fetched by the fetch circuit 110 into decoded instructions 106D to determine the instruction type and actions required. The instruction type and action required that are encoded in the decoded instruction 106D may also be used to determine in which instruction pipeline $I_0$-$I_N$ the decoded instructions 106D should be placed. In this example, the decoded instructions 106D are placed in one or more of the instruction pipelines $I_0$-$I_N$ and are next provided to a rename circuit 120 in the instruction processing circuit 104. The rename circuit 120 is configured to determine if any register names in the decoded instructions 106D should be renamed to decouple any register dependencies that would prevent parallel or out-of-order processing.

The instruction processing circuit 104 in the processor 102 in FIG. 1 also includes a register access circuit (captioned "RACC. CIRCUIT" in FIG. 1) 122. The register access circuit 122 is configured to access a physical register in a physical register file (PRF) (not shown) based on a mapping entry mapped to a logical register in a register mapping table (RMT) (not shown) of a source register operand of a decoded instruction 106D to retrieve a produced value from an executed instruction 106E in the execution circuit 114. The register access circuit 122 is also configured to provide the retrieved produced value from an executed instruction 106E as the source register operand of a decoded instruction 106D to be executed.

Also, in the instruction processing circuit 104, a scheduler circuit (captioned "SCHED. CIRCUIT" in FIG. 1) 124 is provided in the instruction pipeline $I_0$-$I_N$ and is configured to store decoded instructions 106D in reservation entries until all source register operands for the decoded instruction 106D are available. The scheduler circuit 124 issues decoded instructions 106D that are ready to be executed to the execution circuit 114. A write circuit 126 is also provided in the instruction processing circuit 104 to write back or commit produced values from executed instructions 106E to memory (such as the PRF), cache memory, or system memory.

As seen in FIG. 1, the processor-based device 100 further includes a memory system 128 providing a memory management unit (captioned as "MMU" in FIG. 1) 130 that is configured to manage memory accesses. The MMU 130 is communicatively coupled to an instruction translation lookaside buffer (captioned as "INSTRUCTION TLB" in FIG. 1) 132 for caching recently used virtual-to-physical memory address translations for pages containing instructions to be fetched. As shown in FIG. 1, the MMU 130 is also communicatively coupled to a memory controller 134 that is configured to perform memory read and write operations on a system memory 136. The system memory 136 in some aspects may comprise double data rate (DDR) synchronous dynamic random access memory (SDRAM), as a non-limiting example. In some aspects, the instruction TLB 132 may be provided as a constituent element of the MMU 130.

The MMU 130 of FIG. 1 is responsible for performing virtual-to-physical memory address translation operations in support of the virtual memory functionality of the processor-based device 100. In some aspects, the MMU 130 may include a plurality of hierarchical page tables (not shown) containing page table entries that each represent a mapping for a subdivision of the addressable virtual memory space having a specific size. The mappings stored by the page table entries of the hierarchical page tables of the MMU 130 may be cached in TLB entries (not shown) of the instruction TLB 132. In this manner, frequently used virtual-to-physical memory address mappings do not have to be recalculated for every memory access request performed by the MMU 130.

However, as noted above, the performance of the processor-based device 100 may be negatively affected by instruction TLB demand misses, which occur when the instruction TLB 132 does not contain a TLB entry corresponding to a page containing an instruction to be fetched and executed. Such an instruction TLB demand miss may require the processor 102 to stall while it waits for the virtual-to-physical memory address translation to be performed for the page containing the instruction. Conventional approaches to minimizing instruction TLB demand misses may provide suboptimal performance due to their dependence on the occurrence of a previous instruction TLB demand miss that may not occur, and due to their susceptibility to corruption by prefetching done on speculative execution paths.

In this regard, in some exemplary aspects disclosed herein, the processor-based device 100 provides an HTP circuit 138 comprising a last retired page VA indicator 140 and a history table 142. As discussed in greater detail below with respect to FIG. 2, the HTP circuit 138 uses the last retired page VA indicator 140 to track a page VA of a most recently retired instruction (i.e., the last retired page VA), and uses history table entries (not shown) of the history table 142 to associate the value of the last retired page VA indicator 140 with a subsequent instruction TLB demand miss on the instruction TLB 132. The HTP circuit 138 can later query the history table 142 and, if a history table entry that corresponds to the value of the last retired page VA indicator 140 is identified, the HTP circuit 138 initiates an instruction TLB prefetch request for the page VA of the instruction TLB demand miss associated with the value of the last retired page VA indicator 140 in the history table entry.

Figure 2:
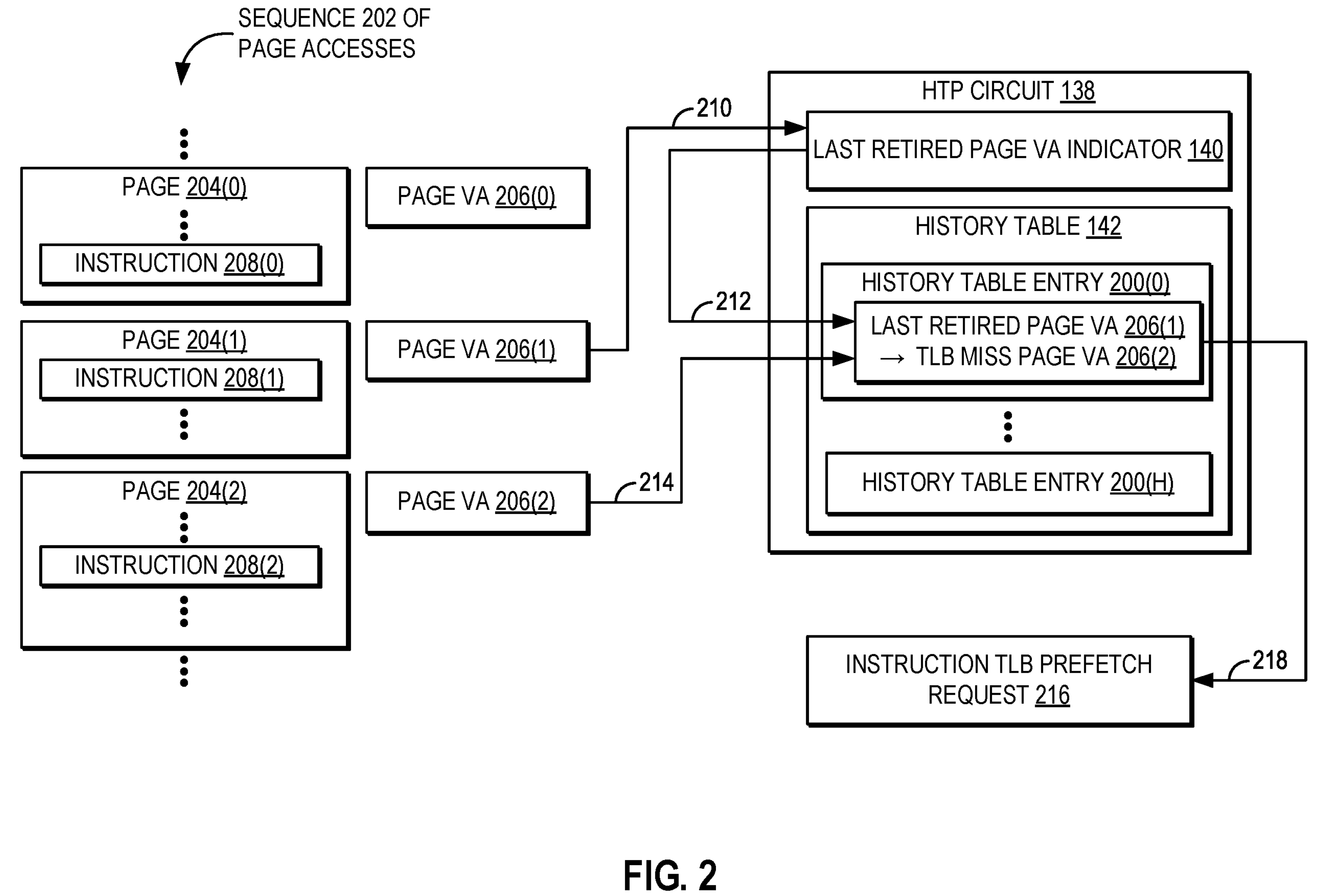
FIG. 2 is a block diagram illustrating exemplary operations and communications flow for using retired pages history for instruction TLB prefetching, according to some aspects.

FIG. 2 illustrates exemplary operations of the HTP circuit 138 of FIG. 1 for using retired pages history for instruction TLB prefetching according to some aspects. As seen in FIG. 2, the HTP circuit 138 comprises the last retired page VA indicator 140 and the history table 142 of FIG. 1. The history table 142 comprises a plurality of history table entries 200(0)-200(H). FIG. 2 also shows a sequence 202 of page accesses, in which a series of pages 204(0)-204(2), each of which has a corresponding page VA 206(0)-206(2), are shown as exemplary pages. At a time previous to the point shown in FIG. 2, the value of the last retired page VA indicator 140 was set to the page VA 206(0) when an instruction 208(0) in the page 204(0) was retired. Subsequently, the next instruction to be retired is an instruction 208(1) in the page 204(1). The HTP circuit 138 determines that the instruction 208(1) has been retired (e.g., by receiving a notification from, monitoring, or otherwise communicating with the instruction processing circuit 104 of FIG. 1). As used herein, an instruction that has been "retired" means that the instruction has been executed and committed by the processor-based device 100 and is no longer being speculatively executed.

The HTP circuit 138 determines the page VA 206(1) of the page 204(1) containing the instruction 208(1), and determines that the page VA 206(1) differs from the value of the last retired page VA indicator 140 (i.e., the page VA 206(0)). Accordingly, the HTP circuit 138 stores the page VA 206(1) as the value of the last retired page VA indicator 140, as indicated by arrow 210. Later in the example of FIG. 2, the HTP circuit 138 determines that an instruction TLB demand for the page VA 206(2) for the page 204(2) containing an instruction 208(2) resulted in a miss. In response, the HTP circuit 138 stores the history table entry 200(0) representing an association of the value of the last retired page VA indicator 140 (as indicated by arrow 212) and the page VA 206(2) (as indicated by the arrow 214). In some aspects, the history table entry 200(0) may comprise a Markov chain that associates the value of the last retired page VA indicator 140 with the page VA 206(2).

During a subsequent iteration of the sequence 202 of page accesses, when the HTP circuit 138 again stores the page VA 206(1) as the value of the last retired page VA indicator 140, the HTP circuit 138 also identifies the history table entry 200(0) as corresponding to the page VA 206(1) and indicating a previous instruction TLB demand miss for the page VA 206(2) of the page 204(2). Accordingly, the HTP circuit 138 initiates an instruction TLB prefetch request 216 for the page VA 206(2) (i.e., to the MMU 130 and/or the instruction TLB 132 of FIG. 1), as indicated by arrow 218.

Figure 3A:
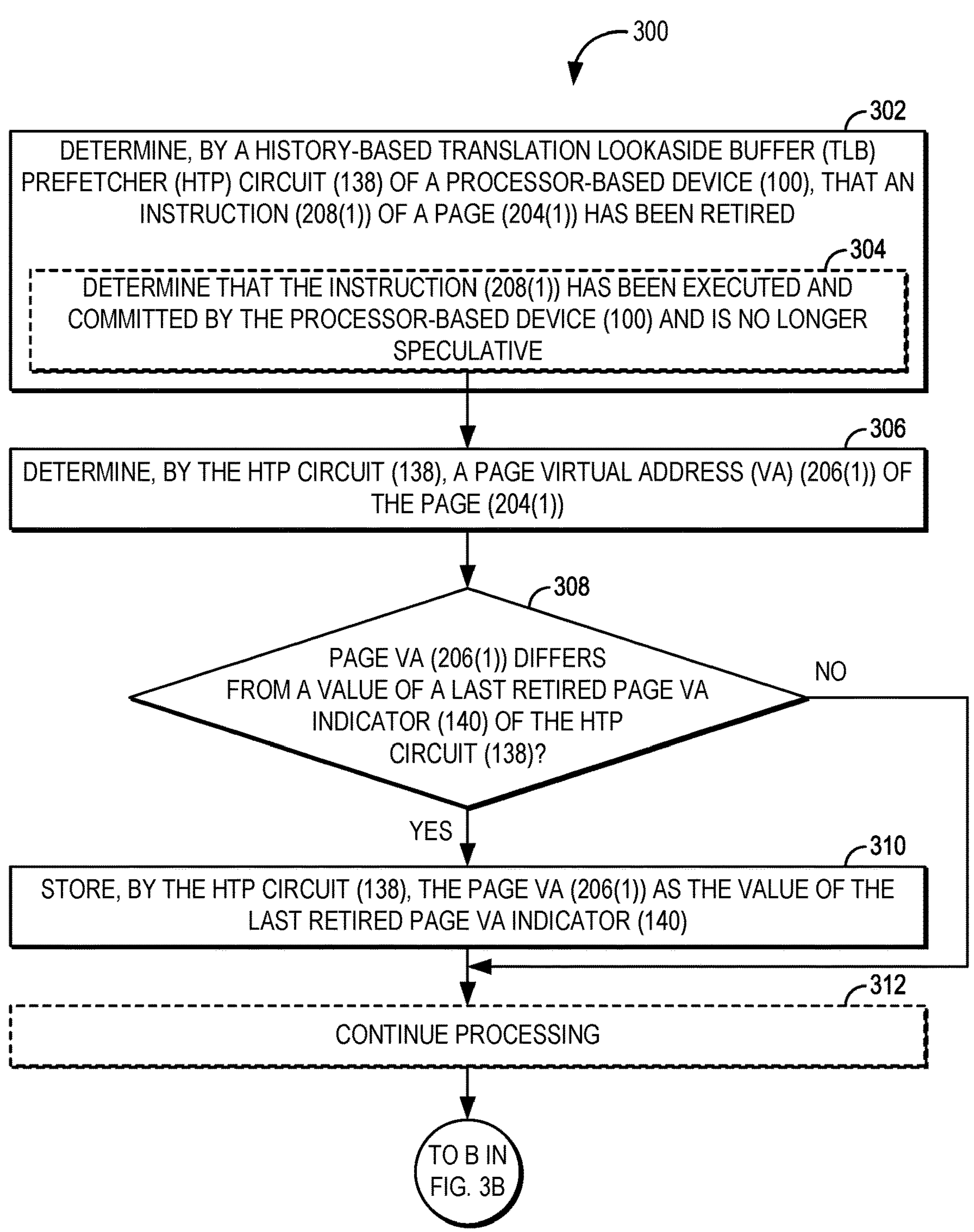
FIGS. 3A and 3B provide a flowchart illustrating exemplary operations by the HTP circuit of FIGS. 1 and 2 for using retired pages history for instruction TLB prefetching, according to some aspects.
Figure 3B:
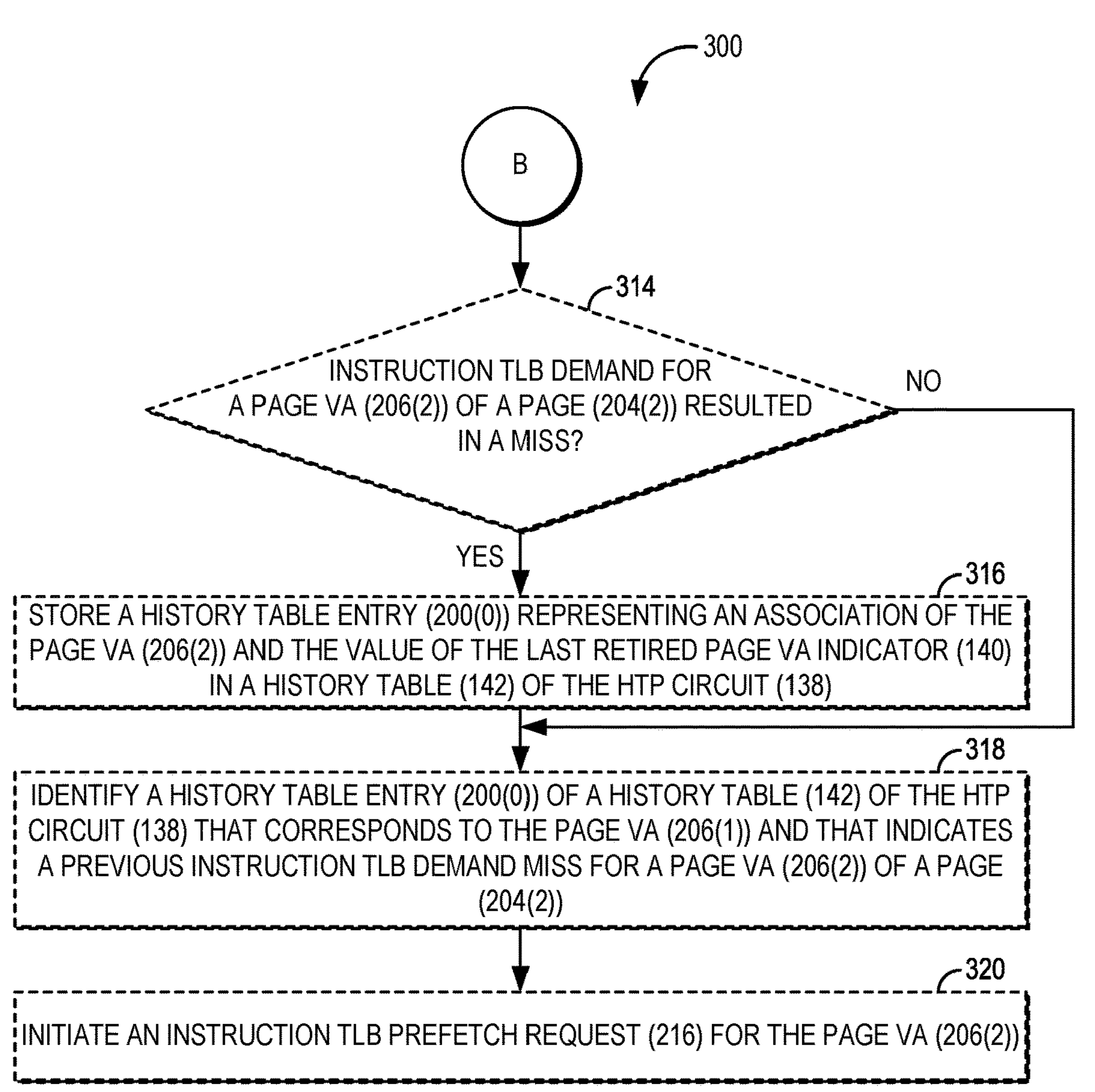

To illustrate exemplary operations by the HTP circuit 138 of FIGS. 1 and 2 for using retired pages history for instruction TLB prefetching according to some aspects, FIGS. 3A and 3B provide a flowchart 300. For the sake of clarity, elements of FIGS. 1 and 2 are referenced in describing FIGS. 3A and 3B. It is to be understood that some aspects may provide that some operations illustrated in FIGS. 3A and 3B may be performed in an order other than that illustrated herein and/or may be omitted. Operations in FIG. 3A begin with an HTP circuit (e.g., the HTP circuit 138 of FIGS. 1 and 2) determining that an instruction (e.g., the instruction 208(1) of FIG. 2) of a page (e.g., the page 204(1) of FIG. 2) has been retired (block 302). In some aspects, the operations of block 302 for determining that the instruction 208(1) of the page 204(1) has been retired may comprise the HTP circuit 138 determining that the instruction 208(1) has been executed and committed by the processor-based device 100 and is no longer speculative (block 304).

The HTP circuit 138 next determines a page VA (e.g., the page VA 206(1) of FIG. 2) of the page 204(1) (block 306). The HTP circuit 138 then determines whether the page VA 206(1) differs from a value of a last retired page VA indicator (e.g., the last retired page VA indicator 140 of FIGS. 1 and 2) of the HTP circuit 138 (block 308). If so, the HTP circuit 138 stores the page VA 206(1) as the value of the last retired page VA indicator 140 (block 310). In some aspects, if the HTP circuit 138 determines at decision block 308 that the page VA 206(1) does not differ from the value of the last retired page VA indicator 140, then processing continues in conventional fashion (block 312). Operations according to some aspects may then continue at block 314 of FIG. 3B.

Referring now to FIG. 3B, some aspects may provide that the HTP circuit 138 may determine whether an instruction TLB demand for a page VA (e.g., the page VA 206(2) of FIG. 2) of a page (e.g., the page 204(2) of FIG. 2) resulted in a miss (block 314). If so, the HTP circuit 138 stores a history table entry (e.g., the history table entry 200(0) of FIG. 2) representing an association of the page VA 206(2) and the value of the last retired page VA indicator 140 (e.g., the page VA 206(1) of FIG. 2) in a history table 142 of the HTP circuit 138 (block 316). If the HTP circuit 138 determines at decision block 314 that no instruction TLB demand miss has occurred, operations in some aspects may continue at block 318.

According to some aspects, the HTP circuit 138 may identify a history table entry (e.g., the history table entry 200(0) of FIG. 2) of the history table 142 of the HTP circuit 138 that corresponds to the page VA 206(1) and that indicates a previous instruction TLB demand miss for the page VA 206(2) of the page 204(2) (block 318). The HTP circuit 138 then initiates an instruction TLB prefetch request (e.g., the instruction TLB prefetch request 216 of FIG. 2) for the page VA 206(2) (block 320).

The HTP circuit according to aspects disclosed herein and discussed with reference to FIGS. 1, 2, 3A, and 3B may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, laptop computer, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, an avionics system, a drone, and a multicopter.

Figure 4:
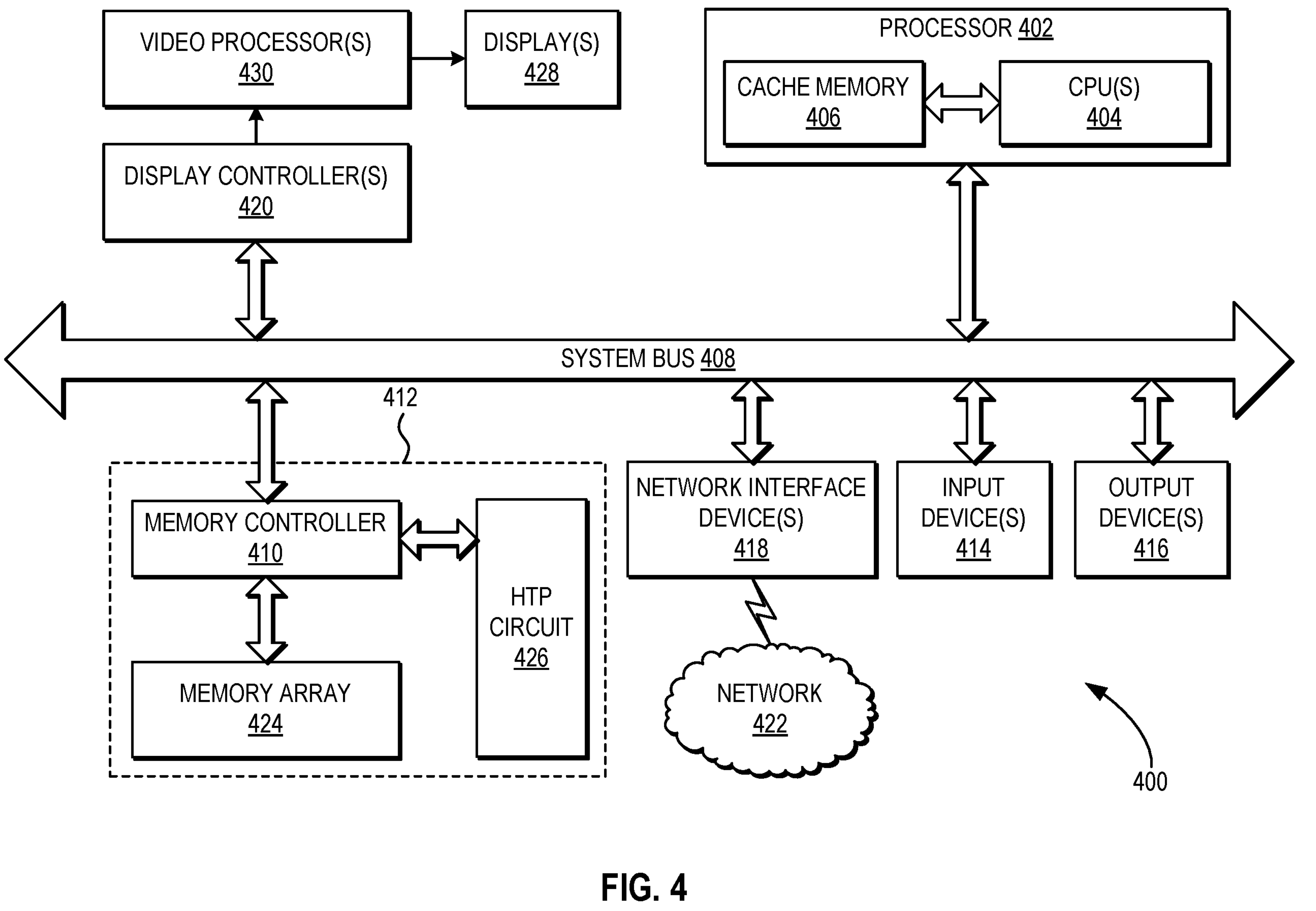
FIG. 4 is a block diagram of an exemplary processor-based device that can include the HTP circuit of FIGS. 1 and 2.

In this regard, FIG. 4 illustrates an example of a processor-based device 400 that includes an HTP circuit as illustrated and described with respect to FIGS. 1, 2, 3A, and 3B. In this example, the processor-based device 400, which corresponds in functionality to the processor-based device 100 of FIG. 1, includes a processor 402 which comprises one or more CPUs 404 coupled to a cache memory 406. The CPU(s) 404 is also coupled to a system bus 408, and can intercouple devices included in the processor-based device 400. As is well known, the CPU(s) 404 communicates with these other devices by exchanging address, control, and data information over the system bus 408. For example, the CPU(s) 404 can communicate bus transaction requests to a memory controller 410. Although not illustrated in FIG. 4, multiple system buses 408 could be provided, wherein each system bus 408 constitutes a different fabric.

Other devices may be connected to the system bus 408. As illustrated in FIG. 4, these devices can include a memory system 412, one or more input devices 414, one or more output devices 416, one or more network interface devices 418, and one or more display controllers 420, as examples. The input device(s) 414 can include any type of input device, including, but not limited to, input keys, switches, voice processors, etc. The output device(s) 416 can include any type of output device, including, but not limited to, audio, video, other visual indicators, etc. The network interface device(s) 418 can be any devices configured to allow exchange of data to and from a network 422. The network 422 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 418 can be configured to support any type of communications protocol desired. The memory system 412 can include the memory controller 410 coupled to one or more memory arrays 424 and an HTP circuit 426 (such as, e.g., the HTP circuit 138 of FIGS. 1 and 2).

The CPU(s) 404 may also be configured to access the display controller(s) 420 over the system bus 408 to control information sent to one or more displays 428. The display controller(s) 420 sends information to the display(s) 428 to be displayed via one or more video processors 430, which process the information to be displayed into a format suitable for the display(s) 428. The display(s) 428 can include any type of display, including, but not limited to, a cathode ray tube (CRT), a liquid crystal display (LCD), a plasma display, a light emitting diode (LED) display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master devices and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

Implementation examples are described in the following numbered clauses:

1. A processor-based device, comprising a history-based translation lookaside buffer (TLB) prefetcher (HTP) circuit configured to:
   determine that a first instruction of a first page has been retired;
   determine a first page virtual address (VA) of the first page;
   determine that the first page VA differs from a value of a last retired page VA indicator of the HTP circuit;
   responsive to determining that the first page VA differs from the value of the last retired page VA indicator of the HTP circuit, store the first page VA as the value of the last retired page VA indicator;
   determine that an instruction TLB demand for a second page VA of a second page resulted in a miss;
   responsive to determining that the instruction TLB demand for the second page VA resulted in a miss, store a history table entry representing an association of the second page VA and the value of the last retired page VA indicator in a history table of the HTP circuit;
   identify the history table entry that corresponds to the first page VA and that indicates a previous instruction TLB demand miss for the second page VA; and
   initiate an instruction TLB prefetch request for the second page VA.
2. A processor-based device, comprising a history-based translation lookaside buffer (TLB) prefetcher (HTP) circuit configured to:
   determine that a first instruction of a first page has been retired;
   determine a first page virtual address (VA) of the first page;
   determine that the first page VA differs from a value of a last retired page VA indicator of the HTP circuit; and
   responsive to determining that the first page VA differs from the value of the last retired page VA indicator of the HTP circuit, store the first page VA as the value of the last retired page VA indicator.
3. The processor-based device of clause 2, wherein the HTP circuit is configured to determine that the first instruction has been retired by being configured to determine that the first instruction has been executed and committed by the processor-based device and is no longer speculative.

4. The processor-based device of any one of clauses 2-3, wherein the HTP circuit is further configured to:
determine that an instruction TLB demand for a second page VA of a second page resulted in a miss; and
responsive to determining that the instruction TLB demand for the second page VA resulted in a miss, store a history table entry representing an association of the second page VA and the value of the last retired page VA indicator in a history table of the HTP circuit.
5. The processor-based device of clause 4, wherein the history table entry comprises a Markov chain.
6. The processor-based device of any one of clauses 4-5, wherein the HTP circuit is further configured to:
identify the history table entry that corresponds to the first page VA and that indicates a previous instruction TLB demand miss for the second page VA; and
initiate an instruction TLB prefetch request for the second page VA.
7. The processor-based device of any one of clauses 2-6, integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.
8. A processor-based device, comprising:
means for determining that a first instruction of a first page has been retired;
means for determining a first page virtual address (VA) of the first page;
means for determining that the first page VA differs from a value of a last retired page VA indicator; and
means for storing the first page VA as the value of the last retired page VA indicator, responsive to determining that the first page VA differs from the value of the last retired page VA indicator.
9. The processor-based device of clause 8, wherein the means for determining that the first instruction has been retired comprises means for determining that the first instruction has been executed and committed by the processor-based device and is no longer speculative.
10. The processor-based device of any one of clauses 8-9, further comprising:
means for determining that an instruction translation lookaside buffer (TLB) demand for a second page VA of a second page resulted in a miss; and
means for storing a history table entry representing an association of the second page VA and the value of the last retired page VA indicator in a history table, responsive to determining that the instruction TLB demand for the second page VA resulted in a miss.
11. The processor-based device of clause 10, wherein the history table entry comprises a Markov chain.
12. The processor-based device of any one of clauses 10-11, further comprising:

means for identifying the history table entry that corresponds to the first page VA and that indicates a previous instruction translation lookaside buffer (TLB) demand miss for the second page VA; and
means for initiating an instruction TLB prefetch request for the second page VA.
13. A method for using retired pages history for instruction translation lookaside buffer (TLB) prefetching, comprising:
determining, by a history-based translation TLB prefetcher (HTP) circuit of a processor-based device, that a first instruction of a first page has been retired;
determining, by the HTP circuit, a first page virtual address (VA) of the first page;
determining, by the HTP circuit, that the first page VA differs from a value of a last retired page VA indicator of the HTP circuit; and
responsive to determining that the first page VA differs from the value of the last retired page VA indicator of the HTP circuit, storing, by the HTP circuit, the first page VA as the value of the last retired page VA indicator.
14. The method of clause 13, wherein determining that the first instruction has been retired comprises determining that the first instruction has been executed and committed by the processor-based device and is no longer speculative.
15. The method of any one of clauses 13-14, further comprising:
determining that an instruction TLB demand for a second page VA of a second page resulted in a miss; and
responsive to determining that the instruction TLB demand for the second page VA resulted in a miss, storing a history table entry representing an association of the second page VA and the value of the last retired page VA indicator in a history table of the HTP circuit.
16. The method of clause 15, wherein the history table entry comprises a Markov chain.
17. The method of any one of clause 15-16, further comprising:
identifying the history table entry that corresponds to the first page VA and that indicates a previous instruction TLB demand miss for the second page VA; and
initiating an instruction TLB prefetch request for the second page VA.

What is claimed is:

1. A processor device, comprising a history-based translation lookaside buffer (TLB) prefetcher (HTP) circuit configured to:
determine that an instruction TLB demand for a first page virtual address (VA) of a first page resulted in a miss; and
responsive to determining that the instruction TLB demand for the first page VA resulted in a miss, store a history table entry representing an association of the first page VA and a value of a last retired page VA indicator in a history table of the HTP circuit;
wherein:
the last retired page VA indicator comprises a most recent page VA of a retired instruction; and
the retired instruction comprises an instruction that has been executed and committed by the processor device and is no longer speculative.

2. The processor device of claim 1, wherein the history table entry comprises a Markov chain.

3. The processor device of claim 1, wherein the HTP circuit is further configured to:

determine that a instruction of a second page has been retired;

determine a second page VA of the second page;

determine that the second page VA differs from the value of the last retired page VA indicator of the HTP circuit; and responsive to determining that the second page VA differs from the value of the last retired page VA indicator of the HTP circuit, store the second page VA as the value of the last retired page VA indicator.

4. The processor device of claim 3, wherein the HTP circuit is configured to determine that the second instruction has been retired by being configured to determine that the second instruction has been executed and committed by the processor device and is no longer speculative.

5. The processor device of claim 3, wherein the HTP circuit is further configured to:

identify the history table entry that corresponds to the second page VA and that indicates a previous instruction TLB demand miss for the first page VA; and initiate an instruction TLB prefetch request for the first page VA.

6. The processor device of claim 1, integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

7. A processor device, comprising:

means for determining that an instruction translation lookaside buffer (TLB) demand for a first page virtual address (VA) of a first page resulted in a miss; and means for storing a history table entry representing an association of the first page VA and a value of a last retired page VA indicator in a history table, responsive to determining that the instruction TLB demand for the first page VA resulted in a miss;

wherein:

the last retired page VA indicator comprises a most recent page VA of a retired instruction; and the retired instruction comprises an instruction that has been executed and committed by the processor device and is no longer speculative.

8. The processor device of claim 7, wherein the history table entry comprises a Markov chain.

9. The processor device of claim 7, further comprising:

means for determining that a second instruction of a second page has been retired;

means for determining a second page VA of the second page;

means for determining that the second page VA differs from the value of the last retired page VA indicator; and means for storing the second page VA as the value of the last retired page VA indicator, responsive to determining that the second page VA differs from the value of the last retired page VA indicator of the HTP circuit.

10. The processor device of claim 9, wherein the means for determining that the second instruction has been retired comprises means for determining that the second instruction has been executed and committed by the processor device and is no longer speculative.

11. The processor device of claim 9, further comprising:

means for identifying the history table entry that corresponds to the second page VA and that indicates a previous instruction TLB demand miss for the first page VA; and means for initiating an instruction TLB prefetch request for the first page VA.

12. A method for using retired pages history for instruction translation lookaside buffer (TLB) prefetching, comprising:

determining, by a history-based TLB prefetcher (HTP) circuit of a processor device, that an instruction TLB demand for a first page virtual address (VA) of a first page resulted in a miss; and responsive to determining that the instruction TLB demand for the first page VA resulted in a miss, storing, by the HTP circuit, a history table entry representing an association of the first page VA and a value of a last retired page VA indicator in a history table of the HTP circuit;

wherein:

the last retired page VA indicator comprises a most recent page VA of a retired instruction; and the retired instruction comprises an instruction that has been executed and committed by the processor device and is no longer speculative.

13. The method of claim 12, wherein the history table entry comprises a Markov chain.

14. The method of claim 12, further comprising:

determining, by the HTP circuit, that a second instruction of a second page has been retired;

determining, by the HTP circuit, a second page VA of the second page;

determining, by the HTP circuit, that the second page VA differs from the value of the last retired page VA indicator of the HTP circuit; and responsive to determining that the second page VA differs from the value of the last retired page VA indicator of the HTP circuit, storing, by the HTP circuit, the second page VA as the value of the last retired page VA indicator.

15. The method of claim 14, wherein determining that the second instruction has been retired comprises determining that the second instruction has been executed and committed by the processor device and is no longer speculative.

16. The method of claim 14, further comprising:

identifying, by the HTP circuit, the history table entry that corresponds to the second page VA and that indicates a previous instruction TLB demand miss for the first page VA; and initiating, by the HTP circuit, an instruction TLB prefetch request for the first page VA.

* * * * *